June 16, 1964 R. A. CUNNINGHAM 3,137,508
BEARING SEAL
Filed Jan. 3, 1961
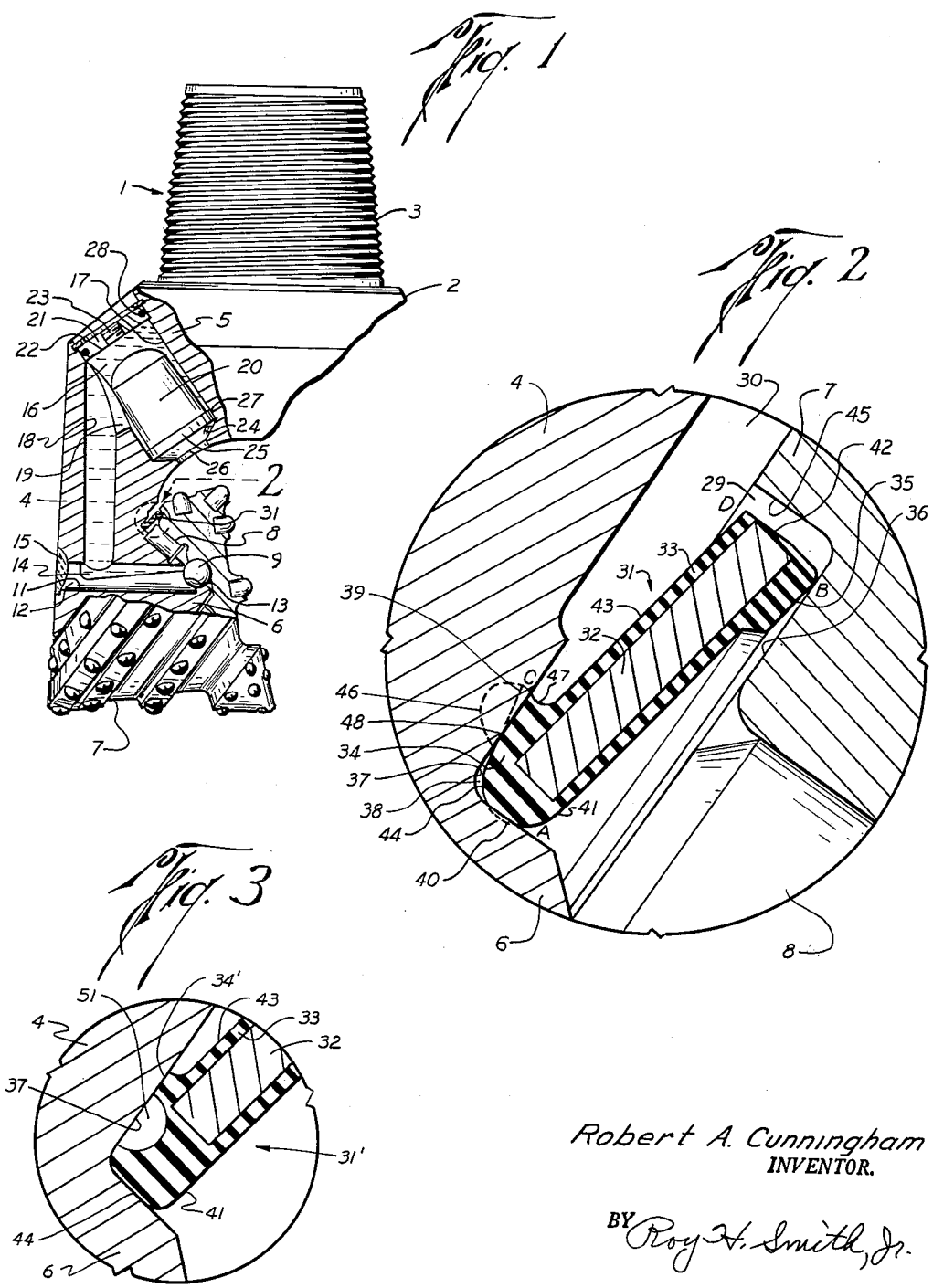
Robert A. Cunningham
INVENTOR.
BY Roy H. Smith, Jr.
ATTORNEY United States Patent Office 3,137,508
Patented June 16, 1964

3,137,508
BEARING SEAL
Robert A. Cunningham, Houston, Tex., assignor to Hughes Tool Company, Houston, Tex., a corporation of Delaware
Filed Jan. 3, 1961, Ser. No. 80,424
7 Claims. (Cl. 277—95)

The present invention relates to improved seals between relatively rotating members, and is of particular utility in preventing the entry of foreign matter into a lubricated bearing. It is an improvement on the bearing seal of the present inventor, together with Cline and Atkinson, disclosed in co-pending application 714,296, filed February 10, 1958, now Patent 3,075,781. The invention is especially useful when the members between which the seal is disposed operate in a fluid atmosphere contaminated with finely divided particles such as rock cuttings, mud, dust, and the like. It also functions to prevent wholesale loss of lubricant from the bearing side of the seal to the contaminated atmosphere. The seal is maintained despite the fact that the relatively rotatable members are subjected to very strong forces, mechanical and hydrostatic, which cause relative axial movement of the members, relative radial movement therebetween, and combinations of such movements such as cocking and wobbling. The seal is maintained even though such relative movement occurs during rotation of one member with respect to the other and such movements become exaggerated as a result of wear.

A particular application of the seals of the present invention is in earth boring rotary drills, and it is illustrated in the accompanying drawing and described below in connection with a rock bit using rolling conical cutters mounted on shafts extending below the body of the bit. It is to be understood, however, that the invention is not limited to such a particular structure, but may be employed in any structure and environment where its advantages may be exploited. It is broadly applied between any pair of relatively rotating members to prevent the penetration of a contaminating fluid to the space between the members, and is not necessarily limited to structures in which one member is mounted on the other. One member may be, for instance, a shaft having a gear or sprocket mounted thereon, while the other member is a housing or guard.

Earth penetrating bits of the rolling cutter type are now conventionally assembled with a combination of roller bearings, ball bearings and journal bearings. While the introduction of antifriction bearing between cutter and shaft has reduced the urgent need for lubricants which characterized older designs using journal bearings exclusively, bearing wear has nevertheless continued to be a vexing problem. Under some circumstances the bearing wear has been so pronounced and rapid as to render the bit unfit for further drilling long before the cutting structure has reached the end of its useful life.

This undesirable result is not avoided by packing a heavy grease into the bearings at the time of assembly, as such assemblies have lacked a means for retaining the grease in place, and it is rapidly exuded by the movement of the cutter and the flushing, leaching and emulsifying actions of the drilling fluid. Attempts to eliminate the problem by forcing a drilling fluid having lubricating characteristics through the bearing before passing it to the bottom of the hole to pick up and carry away the cuttings have also been of no effect. The older approach of providing a large supply of lubricant to keep the bearings continuously supplied as lubricant leaks out have caused so little improvement in bearing life as not to warrant the expense of providing the necessary storage structure.

Such unsuccessful approaches probably overlook what is probably the most significant factor in accelerated bearing wear, the intrusion of foreign matter into the lubricant. It is of little value to keep bearings lubricated if corrosive matter and abrasive powders and cuttings are permitted to penetrate the bearing and mingle with the lubricant, as the erosive and corrosive effects of the foreign matter will be felt despite the presence of the lubricant.

It is therefore the primary object of the present invention to provide a sealed lubricating system which prevents the passage of a contaminant into the space between a pair of relatively rotatable members.

Another object is to provide a lubricating system which thus seals out contaminants and also assures a supply of lubricant in a bearing.

Another object is to provide between a first member and a second member rotatably mounted on the first an atmosphere conducive to long bearing life.

A further object is to provide a seal member cooperating with opposed surfaces of a pair of relatively rotatable members in such manner as to prevent the passage of a contaminating first fluid past such seal in one direction and permit only minor amounts of a second fluid to flow past such seal in the opposite direction.

An additional object is to provide such a seal having such effect when the relative rotation of such parts is accompanied by relative radial, axial or combined movements therebetween, frequently accompanied by distortion of one or both members.

A further and additional object is to provide such a seal which prevents the deposition of solid particles carried by such contaminating fluid between such seal member and said relatively rotatable members.

A more specific object is to furnish a sealed bearing lubricating system for relatively rotatable members in which the lubricant is disposed on one side of such a seal at a pressure equal to the pressure of a foreign fluid disposed on the other side thereof when the lubricant volume between such members has a given value, and in which such lubricant pressure automatically readjusts to such foreign fluid pressure upon a change in said lubricant volume to a second value as a result of other relative movements between such members.

The manner of accomplishing the foregoing objects will be apparent to those skilled in the art from the following description and the accompanying drawings, in which:

FIGURE 1 is an elevation of a rock bit showing only one leg and cutter, partially sectioned to show the elements of the present invention, FIGURE 2 is an enlarged section of the circled area "2" of FIGURE 1, and FIGURE 3 is similar to FIGURE 2, showing an alternate embodiment differing therefrom only in the configuration of the inner end of the seal ring and its disposition with respect to the bit shaft.

FIGURE 1 shows a bit 1 having a head or body 2 terminating in the usual hollow pin 3, tapered and threaded for joining to the lower end of a drill string member (not shown). Bit head 2 also comprises the solid base portion 5 having various passageways not shown therethrough including a number extending from the cavity in pin 3 to either the center interior of the body (drilled watercourses) or the exterior thereof (jet nozzles) for the passage of drilling fluids passing downwardly through the drill string. At least one leg 4 extends integrally and downwardly from head 2, each such leg 4 having an integral bearing pin 6 extending inwardly and downwardly. A cutter 7 is mounted on each bearing pin 6 with roller bearings 8 and ball bearings 9 disposed in mating raceways. Not shown are the familiar pilot pin at the downward end of bearing pin 6, a bushing surrounding such pilot pin and press fitted in the inside of cutter 7, and a thrust button bearing against the pilot pin and also press fitted in cutter 7, all three elements being of high strength, wear resistant alloy steels.

Bearing pin 6 is drilled out to define bore 11 for loading balls 9 into their raceway. When all balls have been loaded, ball plug 12, having end 13 contoured to be flush with the ball raceway, is inserted and secured in place by weld metal 15. It should be noted that the upper portion of ball plug 12 is machined to define recess 14, extending from the ball raceway to the lower end of lubricant passageway 18 in bit leg 4.

The complete lubricating system volume embraces lubricant reservoir 17, lubricant passage or reservoir 18, lubricant passageway 14 in pin 12, the small volumes in the roller and ball raceways surrounding rollers 8 and balls 9, and all other spaces between cutter 7 and shaft 6 lying below seal ring 31. Oil reservoir 17 terminates at the lower interior of base 5 in opening 26, as defined by tapered shoulder 24, and is thus exposed at its lower end to the drilling fluid surrounding each cutter 7. Disposed at the lower end of reservoir 17 is the hollow compensator 20, a member serving as a diaphragm to transmit pressure from the drilling fluid to the lubricant 16. Compensator 20 is secured in reservoir 17 by snap ring 25 which forces its lower periphery into a corresponding groove 27 in the reservoir wall, such retaining structure also serving as a seal to prevent fluid flow around the outside of the compensator.

The compensator 20 is shown in its fully extended or inflated position for the purpose of clarity. It is made of highly resilient material such as rubber in a small thickness, and is collapsed to occupy only a small volume when reservoir 17 is initially filled with lubricant. As lubricant very gradually leaks from the system around seal ring 31, drilling fluid flows into the interior of the compensator through opening 25 and gradually expands it to its fully open position, as illustrated.

The upper end of reservoir 17 is closed and sealed by cap 21 and O-ring 28, cap 21 seating against a shoulder formed by slightly counterboring the upper end of the opening. Cap 21 is secured against upward movement by a snap type split retaining ring 22 disposed in locking position partially in a groove in the counterbore and partially overlying the top of cap 21. The reservoir is filled by removing plug 23 from cap 21 and pouring or forcing lubricant into the system until compensator 20 is collapsed and lubricant can be exuded around the complete periphery of seal ring 31. Plug 23 is then reinstalled to furnish a completely sealed closure at the top of reservoir 17.

Lubricant reservoir 17 communicates directly with lubricant reservoir 18, passage 19 being provided to remove a sharp shoulder which otherwise would be present and would tend to catch and tear resilient compensator 20.

Attention is now invited to FIGURE 2, which shows in enlarged cross section the configuration of seal ring 31 and its manner of cooperating with cutter 7 on the one hand and bit leg 4 and its integral bearing pin 6 on the other. Seal ring 31 is annular and frusto-conical, and consists essentially of a metal core 32 encapsulated in a case 33 of a resilient lubricant resistant material such as one of the rubbers or plastics, materials which form seals with rotating metal surfaces when held in contact therewith. It is not necessary to completely encapsulate the core 32, but it is necessary—and sufficient—to cover it with such resilient material at those points where it slidably contacts metal surfaces. Seal rings consisting of metal cores or springs 32 coated with rubber only at its inside periphery 44 and at upper bead or protuberance 34 and lower bead 35 have been prepared and tested successfully. On the other hand, seals consisting only of metal springs, i.e., with seal 31 made entirely of metal, did not prevent the leakage of flushing fluids under such beads. The seal ring is illustrated as completely encapsulated with rubber in FIGURE 2 simply because those who specialize in applying rubber and plastic coatings to metals find it less expensive to build up a completely encapsulated ring than to coat with two or more narrow and discrete bands.

In its free or uninstalled condition, seal ring 31 has a considerably steeper pitch than that shown, thus producing a tight initial seal when the member is axially compressed into the position shown. The spring or core 32 may be made of any convenient metal of high strength and average ductility, or similar material having like properties. It may be a simple dished ring (Belleville washer), which may or may not be radially corrugated, but the case 33 should include sufficient material to provide wiping surfaces which are smooth, closed and continuous at all areas where the washer contacts surfaces at the bit leg, bearing pin and cutter.

Seal ring 31 is of such construction and disposition as to prevent the flow of flushing fluids from the gap 30 past the circular line contacts with surface 36 of the cutter 7 and surface 37 of leg 4, indicated as points B and C in the section of FIGURE 2, at all times. Similarly, it prevents the flow of lubricants from the bearing lubricant volume past circular line contact A at all times and past contact B in all but minor quantities, the latter leakage being permitted to insure a lubricated contact surface. In speaking of line contacts, what is meant is that the initial contact is between a line or edge of the resilient covering of the seal ring with a surface of the cutter or bit head. It is recognized that under the compressed condition of the seal ring this contact is broadened until it is actually a surface contact of limited area.

It should be borne in mind that earth boring bits are subject to extremely high stresses as a result of the loading of the drill string and the impacts incurred in cutting rock formations. Such loads distort cutter 7 and cause complex movements of the cutter with respect to leg 4 and bearing pin 6, movements which increase in magnitude as the bearings and their raceways become worn through such demanding service. Such movements are axial (using the shaft and cutter axis of revolution as the reference), radial, and combinations of axial and radial relative movement—including the "wobbling" type, i.e., that in which there is relatively little movement of one part of the cone and exaggerated movement of at least one end.

Such movements require that seal ring 31 maintain sealing contact with surfaces 36 and 37 under a wide variety of conditions. The original deflection of the ring insures continuous contact despite downward and upward axial movement of the cutter. A clearance or gap 29 is provided between the outer periphery of the ring and the counterbore wall 45 to allow for localized inward radial movement of the cutter without seizure and binding or buckling of the seal ring.

To insure against leakage past circular contact lines A and C, seal ring 31 is preferably mounted on shaft 6 with an interference fit, the uncompressed contours of case 33 being indicated by the dashed lines 39 and 40. An additional advantage of such mounting is that there is relatively little rotation of the seal ring with respect to bearing pin 6 and surface 37, and thus relatively little rubbing and wearing of bead 34 at unlubricated lines or areas of contact such as C.

Attention is invited in particular to the configuration of the inner part of seal ring 31 and its fit with bearing pin 6 and leg 4. In earliest work on such assemblies, there were two important differences: (1) the fit on bearing pin 6 was quite loose, the inside diameter of the seal ring being, in fact, greater than the shaft diameter, and (2) the surface of bead 34 was parallel to surface 43 on the body of the seal ring, contact with surface 37 being made at a lesser diameter than that of line contact C. With this arrangement, the seal ring not only rotated with respect to leg 4 and bearing pin 6, but also picked up cuttings from the flushing fluid in the wedge shaped gap extending outwardly from the line of contact. Such cuttings became entrapped in the resilient upper bead 34 in the area adjacent such contact and scoured the surface 37 to produce accelerated mud cutting grooves such as are indicated by the dashed line 46, eventually allowing leakage of all lubricant and penetration of the abrasive flushing fluid to the bearings.

It was then proposed to decrease the inside diameter of the seal ring to provide an interference fit on the shaft and thus to prevent both rotation of the ring and penetration of flushing fluid to the bearing, no change being made in the slope of bead 34. These objectives were accomplished, in part, but the accelerated mud cutting continued, apparently because cuttings continued to become entrapped in the bead. Such cuttings seem to nullify the tendency of the ring to be held on the shaft by the interference fit, and allow the ring to rotate and cause mud cutting. In addition, it was believed that the time during which the seal effectively prevented the flushing fluid from entering the bearing could be increased by further improvements.

The mud cutting was finally eliminated by the seal ring of the present invention, wherein contact between surface 37 and seal ring 31 occurs at the outward extremity C of bead 34, and wherein the side surface 47 of the bead defines a large angle with surface 37, thus avoiding any thin pockets which entrapped abrasive cuttings in earlier models. The effective minimum value of this angle was not determined, but angles of 60° and 90° produced excellent results. The minimum separation of surface 43 from surface 37 also was not determined, a distance of 40 mils being used with such angles, measured at the intersection of bead side surface 47 and upper surface 43 of the seal ring.

Such construction has an additional unobvious advantage flowing from the fact that the flushing fluid exerts a pressure axially downwardly over the exposed upper surface of the seal ring, having an area represented by the line CD of the cross section, which is smaller than the corresponding exposed lower surface area represented by the line AB, over which the lubricant exerts a pressure in the opposite direction.

To appreciate this differential area advantage, it must be realized that the previously mentioned axial, radial, etc., movements of the cutter relative to the shaft are pulsating or fluctuating in nature. Such fluctuations alternately increase and decrease the volume between cutter and shaft available for lubricant, and take place with great rapidity, e.g., 1800 fluctuations per minute. The lubrication system provides for pressure equalization from one side of the seal ring to the other in response to gradual changes in pressure and volume, but the inertia of the system is such that it cannot compensate for such rapid changes. The result is a fluctuating lubricant pressure on the inside of the seal ring, such pressure alternately increasing above and decreasing below the pressure of the flushing fluid in gaps 29 and 30 by as much as 50 p.s.i.

When the lubricant pressure is greater than the flushing fluid pressure, the upper bead 34 of seal ring 31 is pressed more tightly than before against surface 37 of the bit leg, insuring against the flow of flushing fluid inwardly past C. At the same time, no lubricant flows upwardly past A because of the interference fit at that point. A small amount of lubricant leaks radially outward on surface 36 past point B, but such leakage is too small to create any problem. It is encouraged as a means of keeping surface 36 fully lubricated and thus preventing abrasion of the seal ring as it glides over the surface at that point. It should be noted that no gap can be formed at B until the lubricant exerts sufficient force to overcome the initial deflection force of the seal ring.

When the flushing fluid pressure is greater than the lubricant pressure, the lower bead 35 of the seal ring is pressed more tightly than before against surface 36 at contact B, preventing the entrance of the flushing fluid at that point. The higher flushing fluid pressure also tends to relieve the compression of the seal ring against the bit leg at C to form a gap at that point. Such tendency, however, is effectively nullified, partly because there is a net inward radial pressure on the seal ring supplementing the force fit to the shaft, and largely because of the differential area advantage mentioned above. In addition, the flushing fluid pressure must also overcome the spring force of the seal ring in its axially compressed condition.

Considering only the resistance brought about by the difference in the areas of seal ring surfaces 41 and 43, it is apparent that no downward movement can take place until the product of the flushing fluid pressure and the area between C and D exceeds the product of the lubricant pressure and the area between A and B. Since the latter area is greater than the former, the flushing fluid pressure must attain some minimum increment over the lubricant pressure before any movement is possible. Thus the pressure surge necessary to force an opening at C is controlled by controlling the areas CD and AB relative to each other.

Such design control is particularly effective at the high flushing fluid pressures employed with rock bits, e.g., 5000 p.s.i., as the incremental pressure necessary to force an opening varies approximately linearly with the initial pressure. Thus a considerably larger increment in flushing fluid pressure is necessary to break the seal at C at 5000 p.s.i. than would be required at atmospheric pressure. At one instance, in an 8¾" rock bit seal 31 was fabricated with distance CD equal to 0.7 of distance AB. With a drilling mud in gap 30 at a pressure of 5000 p.s.i., the lubricant pressure below the seal ring can theoretically fall as low as 4000 p.s.i. before the seal will pull away from the bit leg at C. Since the force fit on bearing pin 6 also acts to prevent such pulling away and a pressure fluctuation of 1000 p.s.i. is extremely unlikely, it can be seen that the entry of flushing fluid at contact C is effectively prevented.

Because the fit of seal ring 31 to bearing pin 6 and surface 37 may not be perfect, the assembly is illustrated in FIGURE 2 as having a gap or pocket 38. After the bit is loaded with lubricant and lowered into a hole, the effect of such a gap and any air initially trapped therein is that of a vacuum, as the initial pressure will be several orders of magnitude lower than the pressure on either side of the seal ring. The entrapped air will be compressed to slightly less than the flushing fluid pressure, and will act as a vacuum to help hold the corner of the seal ring in the corner between bit leg surface 37 and bearing pin 6. An additional advantage of such a fit is the greater unit stress at line contact C than would be the case with a surface contact, thereby making initial entry of flushing fluid more difficult.

This pocket retaining feature has been exploited in the alternate embodiment of FIGURE 3, wherein a pocket 51 is built into seal ring 31'. Other parts of this embodiment, including those not shown, are identical with the like parts of FIGURE 2.

It should be noted that with such construction it is possible to eliminate the interference fit of the seal ring 31' on bearing pin 6 without losing the differential area and elimination of mud-cutting advantages of the present invention. The diameter of the ring at inside surface 44 may be made equal to that of bearing pin 6, or even somewhat larger. Although in the latter case there will be a gap for the entry of lubricant between bearing pin and seal, the surface rather than line contact of the seal with surface 37 prevents the lubricant from exerting a downward axial force which would nullify the differential area advantage, as would be the case if lubricant were to flow past contact A and into pocket 38 of the FIGURE 2 embodiment. Thus flushing fluid is prevented from flowing radially inwardly.

Many other variations of the particular structures shown and described are possible without departing from the spirit and scope of the present invention. The seal ring may be inverted as to slope and may also be radially reversed, for instance, by altering the structure so that surfaces 36 and 37 are reversed with respect to their proximity to the axis of revolution. Contact B would still be lowermost but closer to the shaft or bearing pin, while contact C would lie toward the outside. To provide an interference fit to the bit leg, a short protuberance axially downwardly from the bit leg adjacent the newly oriented surface 37 would be provided. It is similarly possible to provide orientations of these surfaces such that both are coaxial with the axis of revolution with an interference fit, if desired, on either of the relatively rotating members.

Surfaces 36 and 37 may have various attitudes with respect to the axis of rotation, and need not necessarily be parallel, but the distance between them should never be so large as to exceed the available deflection of seal ring 31, especially in view of variations imposed by loading and wear, and each surface should be a continuous surface of revolution to provide smooth wiping contact with the seal ring. The seal ring need not necessarily have the surface of the lower covering or bead 35 parallel to surface 41, but such construction is preferable to a surface contact because a line contact maximizes unit stress and thus provides a better seal, and is preferable to contact at a smaller diameter to maximize the area over which the lubricant exerts its pressure.

Many modifications in the lubricating system structure are possible, the essential features being a lubricant reservoir connected with the inter-bearing volume up to the seal ring, and sealingly separated from the flushing fluid by means for transmitting the pressure of the latter to the lubricant in the reservoir. The system shown is preferred, e.g., to one in which the positions of cap, compensator and opening are reversed, as with the latter orientation rock cuttings tend to settle out and collect inside the compensator.

The present invention may be considered to be primarily the provision of a frusto-conical seal ring engaging opposed faces of a pair of relatively rotatable members in which there are three novel features, each of which defines an unobvious improvement in the art. First, the exposed portion of the upper surface of the seal ring, that facing a source of contamination, is smaller in area than the corresponding exposed lower surface, that facing a lubricant volume or other region to be protected.

The second novel feature of the invention lies in the upper bead or protuberance from the surface facing the abrasive flushing fluid. As previously indicated, this reduces or entirely eliminates the entrapment of abrasive materials and consequent mud cutting, because no material can flow past the line contact at the outer periphery of the protuberance.

The third novel feature, the interference fit of the seal ring on a shaft or shoulder of one member, aids in preventing abrasive material from penetrating the bearing space, and substantially prevents rubbing of the seal ring against unlubricated surfaces. The seal ring rubs only against the rotating member and its lubricated surface with line contact, minimizing wear and prolonging useful life. It should be noted that the interference fit of the seal ring on the shaft does allow for a very small amount of rotation therebetween, as indicated above. Complete and unmovable seizure of the ring to the shaft is undesirable because abrasive wear would then be concentrated at the one area where abrasion is most likely, viz., at the lowermost extremity of the contact between cutter and bit head in normal operating position, just below the weld plug 15 in FIGURE 1. Some very gradual rotation is desirable and is encouraged to equalize such wear, e.g., half a dozen revolutions of the seal ring around the shaft during the life of the bit.

What is claimed is:
1. In a machine having one member rotatably mounted on a second member, the improvement comprising a pair of generally radially extending annular surfaces coaxial with the axis of rotation of the second member, one said surface on each member and said surfaces facing each other to define an annular gap of elongated radial dimension and relatively short axial dimension, and an annular, axially elastically flattenable seal ring disposed in said gap and making sealing contact with said pair of surfaces, said seal ring having the general form of a slightly dished conical shell with a relatively small thickness, and a relatively elongated slant height less than said radial dimension of the gap, oppositely directed upper and lower faces along said slant height having approximately equal projected areas on an imaginary common plane extending generally radially, inner and outer peripheries of relatively small dimension intersecting said faces to define corners therewith, two of said corners being generally diagonally disposed and generally defining the axial extremities of the seal ring, and also having an axial height between said two diagonally disposed corners which define the axial extremities of said seal ring, said axial height in the relaxed position of said seal ring being greater than said axial dimension of the gap and being reduced in assembly to provide said sealing contacts, said seal ring including sealing portions in the vicinity of both of said two diagonally disposed corners making said sealing contacts with said surfaces, the first said sealing portion making only line contact with one of said surfaces at approximately one said corner and the second making surface contact with the other said surface along an annular area of the seal ring radially located between the other said corner and a line of contact spaced from said corner along the adjacent face in part defining said other corner, said area of contact having one terminus along said line of contact, whereby said seal ring face in part defining said first of the diagonally opposed corners presents a larger area to any ambient fluid thereabout than does the other seal ring face, that in part defining said second corner, to any fluid ambient thereabout and acting thereon.

2. In a machine having one member rotatably mounted on a second member, the improvement comprising the surfaces on such members and the seal ring as described in claim 1 and in which one of said members also includes a generally axially extending surface transverse its generally radially extending surface in common relatively rotatable relationship therewith, and in which the second of the sealing portions of said seal ring also sealingly contacts said axially extending surface, whereby said seal ring provides said advantage of different exposed areas even thorugh said annular surface contact in the vicinity of said second seal ring corner may be mininal.

3. The improvement of claim 2 in which said second sealing portion makes sealing contact with the radially extending surface of the member also having the axially extending surface to provide maximum pressure at said radially spaced line of contact.

4. The improvement of claim 3 in which said second sealing portion of the sealing ring has a relatively sharp protuberance in part defining said spaced line of contact, whereby a thin tapering pocket between the adjacent seal ring face and the surface sealed by said portion which might entrap erosive particles is avoided.

5. The improvement of claim 1 in which the second of said sealing portions of the seal ring contains an annular groove facing the other said sealed surface and makes surface contact therewith on both sides of said groove.

6. In a machine in which one member is rotatably mounted on a shaft extending from a fixed member, there being an annular shoulder on such fixed member extending generally radially outwardly from said shaft and forming a corner therewith and a corresponding annular shoulder on said rotatable member also extending generally radially and facing said fixed shoulder to define an annular gap of short axial dimension and relatively elongated radial dimension, both such dimensions varying somewhat in operation of the machine and after wear of such members, the improvement comprising an annular, axially elastically flattenable seal ring interferingly and sealingly mounted on said shaft and partially compressed between said shoulders in sealing engagement therewith, said seal ring (1) having the general shape of a frusto-conical shell
(2) with a relatively stiff but axially resilient core such as metal and a case of a resilient but deformable sealing material such as rubber over at least those portions of the seal ring contacting said members,
(3) having upper and lower faces slightly pitched from a radially extending contour, inner and outer peripheries of generally axially extending contour, pairs of diagonally opposed peripheral intersections of said faces and peripheries, the pitch of said faces being such that one said peripheral intersection is disposed at said corner with the defining periphery thereof contacting said shaft and the defining face thereof contacting the shoulder at said corner and the diagonally opposed peripheral intersection sealingly contacting said shoulder of the rotatable member with only line contact, and a protuberance of said covering from the face interferingly and sealingly contacting said fixed shoulder, said protuberance having a side surface extending generally axially from said face and a generally radially extending outer surface intersecting at a relatively sharp corner spaced from the peripheral intersection disposed at the corner of said fixed member, said upper face sloping from said protuberance corner to said intersection with less pitch than that of said upper and lower faces so that said corner furnishes a line of maximum pressure between said seal ring and said shoulder, and
(4) having a thickness between said upper and lower faces less than the axial dimension of said gap, an axial height which in the relaxed position of the ring is greater than the maximum axial dimension of the gap, and a slant height or distance between peripheries less than the minimum radial dimension of said gap.

7. A seal consisting essentially of an annular, axially elastically flattenable seal ring (1) having the general form of a conical shell
(2) with upper and lower faces pitched from a radially extending contour, inner and outer peripheries meeting said faces to define two pairs of diagonally opposed peripheral intersections of which one pair has a first peripheral intersection defining one axial extremity of the seal ring and a second peripheral intersection in the vicinity of the other axial extremity,
(3) said seal ring having a relatively small thickness measured normally between said faces, a larger axial height between said axial extremities, and a slant height between said peripheries elongated with respect to both said thickness and said axial height,
(4) and consisting of a relatively stiff but axially resilient core of such material as steel and at least a partial covering thereon of a resilient but elastically deformable sealing material such as rubber,
(5) said covering including a first portion disposed at said first axially extremal peripheral intersection and defining the same by the intersection of its side face and outer face, said side face extending generally axially and at least in part defining the periphery adjacent said edge and said outer face extending generally parallel to said upper and lower faces,
(6) and a second portion disposed at said second extremal peripheral intersection, said second portion extending radially to define the periphery adjacent said edge and also extending axially as a relatively sharp protuberance from the upper or lower face adjacent said second intersection said protuberance having a side face radially spaced from but adjacent said second peripheral intersection,
(7) said protuberance having a side face radially spaced from but adjacent said second peripheral intersection which extends generally axially and an outer face which extends generally radially to said peripheral edge with less pitch than said upper and lower faces and which intersects said side face at a relatively sharp corner, said seal ring being adapted to be generally coaxially mounted in and at least partially flattened in an annular gap between a pair of opposed, generally radially extending surfaces of a pair of relatively rotatable members, one of which also has a surface extending generally axially and transverse its radial surface to define one radial extremity of said gap, with the second portion of said covering in interfering and sealing contact with both the axial and radial surfaces of such one member, at least a portion of the outer face of said protuberance at and adjacent said sharp corner thereof making sealing contact with said radial surface with maximum pressure at said sharp corner, and with the first portion of said covering in sealing line contact with the other radial surface at said first peripheral intersection of the seal ring, such annular gap having a relatively small axial dimension less than said axial height of the seal ring but greater than its thickness and an elongated radial dimension greater than the slant height of the seal ring.

References Cited in the file of this patent
UNITED STATES PATENTS

| | | |
|---|---|---|
| 1,909,078 | Scott | May 16, 1933 |
| 2,560,557 | Curtis | July 17, 1951 |
| 2,797,067 | Fisher | June 25, 1957 |
| 2,858,176 | Thompson | Oct. 28, 1958 |

FOREIGN PATENTS

| | | |
|---|---|---|
| 1,132,266 | France | Oct. 29, 1956 |
| 558,356 | Belgium | June 29, 1957 |
| 564,138 | Belgium | July 22, 1958 |
| 568,190 | Belgium | Dec. 1, 1958 |